US011329754B2

(12) United States Patent
Jorgenson et al.

(10) Patent No.: US 11,329,754 B2
(45) Date of Patent: May 10, 2022

(54) VARIABLE DATA RATE BROADCAST METHOD FOR CHANNELS REQUIRING EQUALIZATION

(71) Applicant: Rockwell Collins, Inc., Cedar Rapids, IA (US)

(72) Inventors: Mark B. Jorgenson, Kanata (CA); Robert W. Johnson, Ottawa (CA)

(73) Assignee: Rockwell Collins, Inc., Cedar Rapids, IA (US)

( * ) Notice: Subject to any disclaimer, the term of this patent is extended or adjusted under 35 U.S.C. 154(b) by 149 days.

(21) Appl. No.: 16/807,548

(22) Filed: Mar. 3, 2020

(65) Prior Publication Data
US 2021/0281355 A1    Sep. 9, 2021

(51) Int. Cl.
*H04L 1/00*  (2006.01)
*H04L 1/16*  (2006.01)
*H04L 1/20*  (2006.01)
*H04L 5/00*  (2006.01)

(52) U.S. Cl.
CPC .......... *H04L 1/0002* (2013.01); *H04L 1/0041* (2013.01); *H04L 1/0057* (2013.01); *H04L 1/0071* (2013.01); *H04L 1/1628* (2013.01); *H04L 1/20* (2013.01); *H04L 5/0007* (2013.01)

(58) Field of Classification Search
CPC ... H04L 1/0002; H04L 1/0003; H04L 1/0009; H04L 1/0041; H04L 1/0048; H04L 1/0057; H04L 1/007; H04L 1/0071; H04L 1/0089; H04L 1/1628; H04L 1/20; H04L 5/0007; H04L 5/0212; H04L 25/0224; H04L 25/03057; H04L 5/00–0098; H04L 25/02–0298; H04L 25/03–03993
See application file for complete search history.

(56) References Cited

U.S. PATENT DOCUMENTS

| 7,139,237 | B2 |    | 11/2006 | Nangia et al. |
| 7,227,851 | B1 | *  | 6/2007  | Gopalakrishnan .... H04L 1/0025 370/335 |
| 10,075,266 | B2 |   | 9/2018  | Luo et al. |
| 10,225,041 | B2 |   | 3/2019  | Chen et al. |
| 10,284,337 | B2 | * | 5/2019  | Peng ........................ H04L 5/22 |

(Continued)

FOREIGN PATENT DOCUMENTS

| EP | 1759507 B1 | 1/2015 |
| IN | 2-1827028291 A | 8/2017 |

*Primary Examiner* — Chi H Pham
*Assistant Examiner* — Vladislav Y Agureyev
(74) *Attorney, Agent, or Firm* — Suiter Swantz pc llo

(57) ABSTRACT

A system and method for including multiple data rate sub-blocks within a single data block includes dividing data blocks based on a priority or intended set of recipients. The sub-blocks are modulated at increasing data rates and the modulated sub-blocks are appended together and bounded by the known symbol blocks during transmission. The sub-blocks are organized in order of increasing data rate. During decoding, detected symbols of a first, low data rate sub-block are included in the detection process of higher data rate sub-blocks in place of additional symbols that would otherwise be needed for higher data rate transmissions. Alternatively, the sub-blocks may be organized with low data rate sub-block at the periphery and higher data rate sub-blocks in the interior such that the data block may be decoded from both ends.

13 Claims, 5 Drawing Sheets

(56) References Cited

U.S. PATENT DOCUMENTS

| | | | |
|---|---|---|---|
| 11,223,443 B2* | 1/2022 | Jang | H04L 1/0067 |
| 2007/0234172 A1* | 10/2007 | Chiabrera | H04L 1/0043 |
| | | | 714/752 |
| 2008/0130616 A1* | 6/2008 | Wengerter | H04L 47/2491 |
| | | | 370/345 |
| 2008/0240264 A1* | 10/2008 | Ionescu | H04L 25/03159 |
| | | | 375/260 |
| 2008/0313526 A1* | 12/2008 | Choi | H04L 27/34 |
| | | | 714/780 |
| 2009/0022079 A1 | 1/2009 | Zhou et al. | |
| 2009/0109999 A1* | 4/2009 | Kuri | H04L 1/0003 |
| | | | 370/465 |
| 2009/0238240 A1* | 9/2009 | Lakkis | H04L 25/03057 |
| | | | 375/130 |
| 2010/0158053 A1* | 6/2010 | Kim | H04L 1/0052 |
| | | | 370/536 |
| 2011/0182372 A1* | 7/2011 | Song | H04L 1/0071 |
| | | | 375/259 |
| 2012/0039234 A1* | 2/2012 | Hoshino | H04L 5/0035 |
| | | | 370/312 |
| 2012/0051307 A1* | 3/2012 | Huang | H03M 13/2957 |
| | | | 370/329 |
| 2015/0098420 A1* | 4/2015 | Luo | H04L 5/003 |
| | | | 370/329 |
| 2017/0207878 A1* | 7/2017 | Chen | H04L 1/0025 |
| 2018/0316464 A1 | 11/2018 | Stern-Berkowitz et al. | |
| 2018/0351697 A1* | 12/2018 | Kim | H04W 28/04 |
| 2019/0181983 A1* | 6/2019 | Ye | H04L 1/0009 |
| 2019/0229861 A1* | 7/2019 | Yoshimura | H04L 1/00 |
| 2019/0327024 A1* | 10/2019 | Lee | H04L 27/2604 |
| 2019/0335423 A1* | 10/2019 | Wu | H04W 72/0453 |
| 2020/0081766 A1* | 3/2020 | Giancristofaro | H03M 13/6566 |
| 2020/0083983 A1* | 3/2020 | Chen | H03M 13/618 |
| 2020/0236587 A1* | 7/2020 | Kim | H04L 1/1864 |
| 2020/0259589 A1* | 8/2020 | Bae | H04L 1/0041 |
| 2021/0044384 A1* | 2/2021 | Sengupta | H04L 1/0045 |
| 2021/0203450 A1* | 7/2021 | Xu | H04L 1/1819 |

\* cited by examiner

VARIABLE DATA RATE BROADCAST METHOD FOR CHANNELS REQUIRING EQUALIZATION

BACKGROUND

In systems that broadcasts data to multiple users, some users of the service may be unable to receive data that could be sent at high rates to other users. To maximize the utility of the service, it would be desirable to vary the data rate of the broadcast. For packets that must be received by all users, a low data rate must be used so that all users would be expected to receive the packets. In other cases, where the intended recipients are a subset of the total community, higher data rates (sometimes much higher) could be used. However, the cost associated with changing data rates must be balanced against the benefit obtained by being able to use higher data rates; in some applications, that cost is substantial.

For radio-frequency transmission, a preamble is often sent to aid in detection and synchronization. Where preambles are substantial, distinct transmissions for every change in data rate are burdensome and it is more efficient for the transmitter to remain keyed at all times.

In channels that require equalization, a group of known symbols is often included on either side of a data block of unknown symbols to be demodulated. The number of known symbols needed is related to the received channel impulse response, where received signals with more multipath delay spread require more known symbols. Currently known systems employ the same modulation for all symbols within the data block, bounded by the known symbols on either side. Data rate changes in such systems would require additional known symbol segment that would severely impact bandwidth.

SUMMARY

In one aspect, embodiments of the inventive concepts disclosed herein are directed to a system and method for including multiple data rate segments within a single data block. Data blocks are divided based on a priority defined by an intended set of recipients, content of the data, or some other features as may necessitate different modulations. The sub-blocks are encoded at increasing data rates and the encoded, modulated sub-blocks are appended together and bounded by the known symbol blocks during transmission.

In a further aspect, the sub-blocks are organized in order of increasing data rate. During decoding, decoded symbols of a first, low data rate sub-block are included in the decoding process of higher data rate sub-blocks in place of additional symbols that would otherwise be needed for higher data rate transmissions, with the decision device changing with each sub-block. The decision device may use different constellations, or change from a simple symbol-based decision device to multiple chips per symbol for lower rates.

Alternatively, the sub-blocks are organized with low data rate sub-block at the periphery and higher data rate sub-blocks in the interior such that the data block may be decoded from both ends.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
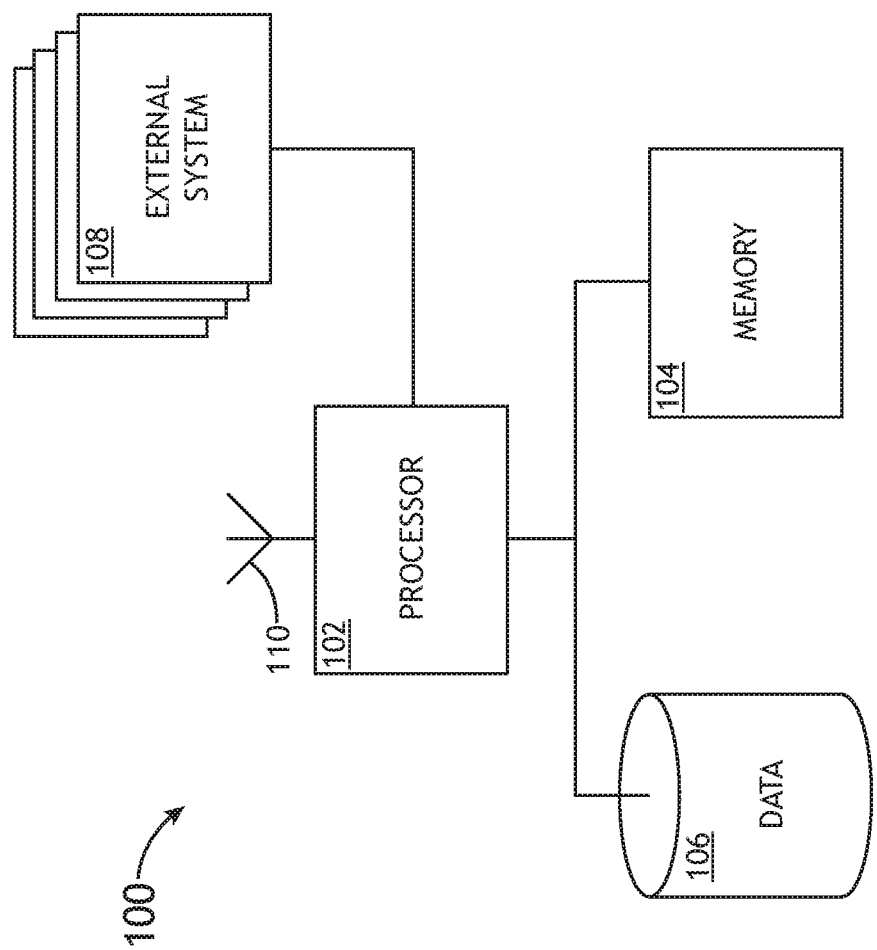
FIG. 1 shows a block diagram of a system for implementing an exemplary embodiment of multi-data rate modulation.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for including multiple data rate segments within a single data block. Data blocks are divided into sub-blocks based on a priority defined by an intended set of recipients, content of the data, or some other features as may necessitate different modulations. The sub-blocks are encoded at increasing data rates and the encoded, modulated sub-blocks are appended together and bounded by the known symbol blocks or known signal component during transmission.

Referring to FIG. 1, a block diagram of a system 100 for implementing an exemplary embodiment of multi-data rate modulation is shown. The system 200 includes a processor 102 in data communication with a memory 104 for storing processor executable code. The processor 102 is configured to encode or modulate data at different data rates; lower data rate transmissions are more robust and more likely to be received and correctly decoded, but have relatively low bandwidth; high data rate transmissions allow for more data to be transmitted in a given time, but are prone to errors in reception.

In at least one embodiment, the processor 102 prioritizes data for encoding and modulation based on the type of data, the source of data, and/or the intended recipients. High priority data is modulated at a low data rate, and therefore higher robustness, to facilitate accurate reception. Lower priority data is progressively modulated at higher data rates. The data may be received from a data source 106 connected to the processor 102, or from one or more external sources 108 such as various systems in data communication with the processor 102. The separately encoded and modulated data is organized into a singular stream and a set of known symbols to aid in data detection. In at least one embodiment, the data may be prioritized on the basis of desired recipients; if the recipients of certain data include recipients that are known to have poor reception or to be in areas where the transmission spectrum is contested, data to those recipients may be at a low data rate. Conversely, data exclusively for recipients know to be accessible via high data rate transmission may be encoded and modulated at a high data rate.

Once the various sub-blocks are assembled into a single stream, the stream is transmitted via a wireless communication element 110. In at least one embodiment, the system 100 is embodied in a mobile platform such as an aircraft. It should be appreciated that the specific variable data rate functionality described herein may be embodied in transmit only and receive only systems. For example, a ground station may be configured to only transmit data via variable data rate modulated sub-blocks while aircraft are only configured to receive data via variable data rate modulated sub-blocks.

Furthermore, the processor 102 may be configured to receive a signal encoded and modulated according to the present disclosure. The processor 102 may be configured for decision feedback equalization or estimation. In such case, the sub-blocks may be organized with the lowest data rate, most robust sub-blocks detected first and decoded symbols may be used to assist in decoding higher data rate sub-blocks. Feedback errors from incorrectly detected symbols will not thereby corrupt the detection of symbols that would otherwise be correctly decoded. In at least one embodiment, where decision feedback equalization proceeds from the start of the block to the end of the block, the most robust symbols are disposed at the beginning of the block, with progressively less robust sub-blocks from the beginning to the end of the block. Alternatively, where equalization starts at either end of the block and works to the middle, the most robust symbols are disposed in sub-blocks on the outer edge or periphery of the data block. Modulation options include phase-shift keying ("PSK") and quadrature amplitude modulation symbol variants, as well as modulations which include multiple chips (at the signaling rate) formed into a symbol spanning the multiple chips. For example, multiple PSK chips can be combined into a Walsh encoded symbol for robustness, substantially exceeding that afforded by simple binary PSK signaling. It should be appreciated that other modulation options are envisioned and may be used in conjunction with embodiments of the present disclosure.

In at least one embodiment, a channel impulse response estimate that is used in the detection of the sub-blocks may be updated based on the decisions made in the preceding sub-blocks to improve the estimation of subsequent decisions. A block decision feedback estimator solves the equalization problem as a matrix algebra problem. In at least one embodiment, the processor 102 includes information, in the more robust sub-block, pertaining to the modulation being used in less robust sub-blocks. This information could include the disposition of subsequent sub-blocks, allowing only the size of the most robust sub-block to be known in advance. Size, in terms of numbers of symbols, and modulation used with each sub-block could be provided in the most robust sub-block to allow detection of sub-blocks with modulations and sizes not known to the receiver prior to the detection of the initial sub-block with almost no additional cost in the solution procedure.

Figure 2:
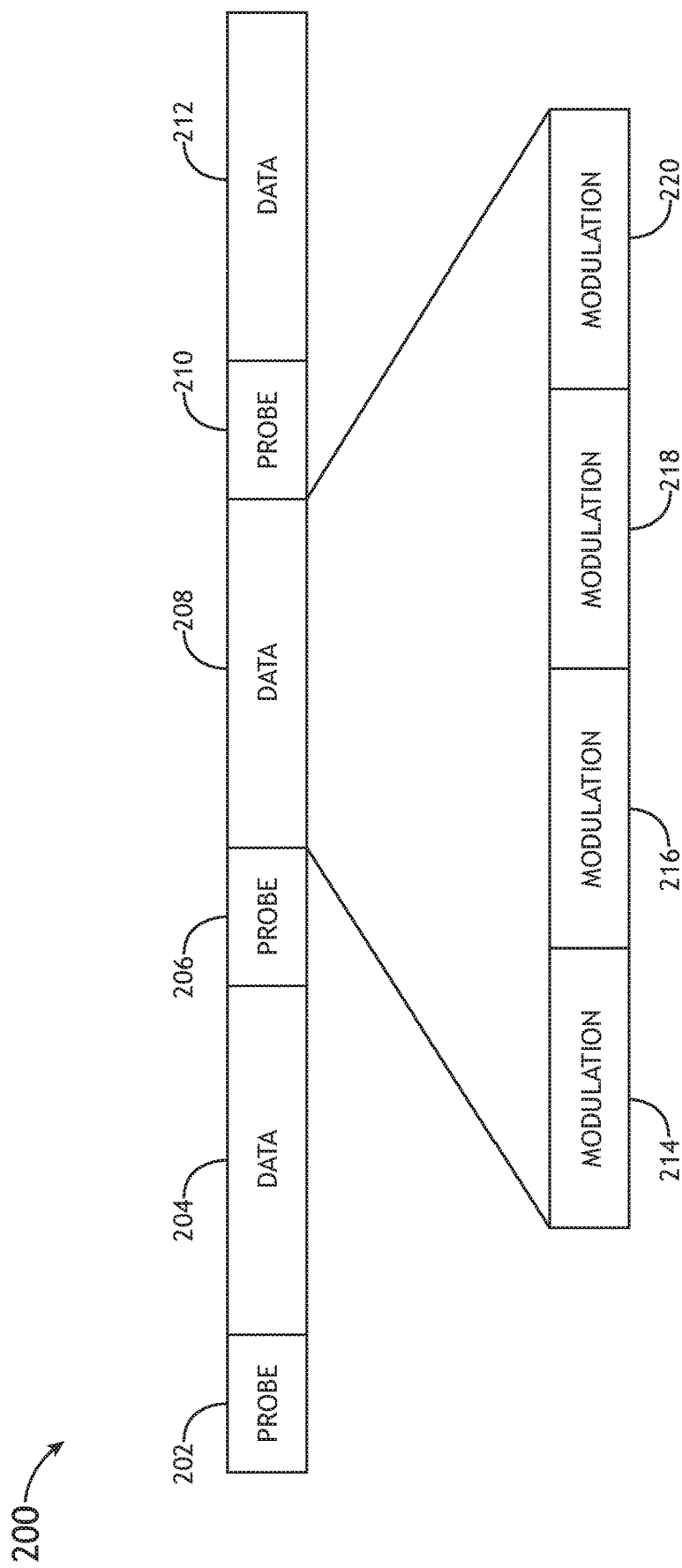
FIG. 2 shows a block diagram representation of a stream according to an exemplary embodiment.

Referring to FIG. 2, a block diagram representation of an encoded stream 200 according to an exemplary embodiment is shown. The stream 200 comprises known symbol segments 202, 206, 210 surrounding encoded data blocks 204, 208, 212. Each data block 204, 208, 212 may comprise a plurality of different data rate modulated sub-blocks 214, 216, 218, 220.

In at least one embodiment, because the known symbol segments 202 are applicable to all of the sub-blocks 214, 216, 218, 220 within the corresponding data block 208, the sub-blocks 214, 216, 218, 220 are organized to facilitate accurate decoding. The sub-blocks 214, 216, 218, 220 may be organized with the lowest data rate sub-block 214 first. A decision feedback equalization process may utilize symbols determined from decoding the lowest data rate sub-block 214 to update the solution when decoding higher data rate sub-blocks 216, 218, 220. In at least one embodiment, decomposed vectors are updated. Alternatively, or in addition, channel impulse response estimates are recomputed based on previous decisions, the linear (or linear time-varying) estimation is redone for undetected sub-blocks. Alternatively, where the stream 200 is decoded from both ends, the sub-blocks 214, 216, 218, 220 may be organized with low data rate sub-blocks 214, 220 at the periphery, and higher data rate sub-blocks 216, 218 in the interior.

Figure 3:
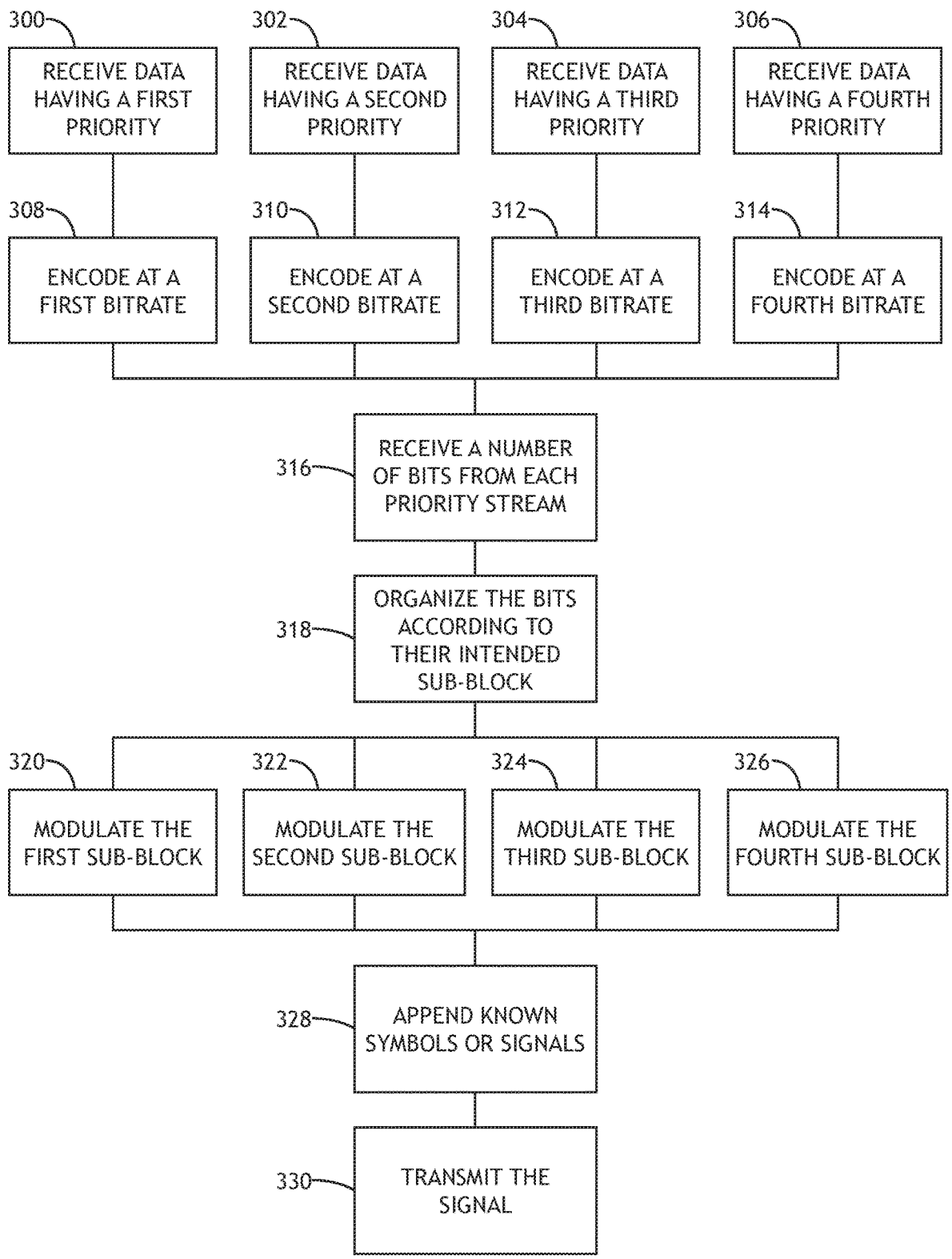
FIG. 3 shows a flowchart for a method of modulating a data stream at variable data rates according to an exemplary embodiment.

Referring to FIG. 3, a flowchart for a method of encoding a data stream at variable data rates according to an exemplary embodiment is shown. A system implementing the method receives 300, 302, 304, 306 two or more data segments having different priorities to be encoded and modulated into sub-blocks of a larger data block for transmission; for example, a first data segment has the highest priority with later data segments having descending priority. In at least one embodiment, priority is determined based on the source and/or content of data. Alternatively, or in addition, priority may be determined based on the known state of necessary recipients. It should be appreciated that within the context of the present application, priority refers the intended modulation of resulting sub-block and not to any qualitative measure of the importance of the data.

In at least one embodiment, each data segment comprises a virtual channel associated with a particular modulation (and hence robustness). Such virtual channels segregate user data into data segments that will comprise sub-blocks of the overall data block. For example, a broadcast transmission that maintains the same categories over a period of time during which many data blocks are sent, the system may be organized with multiple independent inputs, each having a different data rate. In at least one embodiment, the inputs may be treated independently, with the supportable data rate for each only depending upon the portion of the overall data block allocated to the respective sub-blocks and the modulation and coding applied to the symbols in the sub-blocks. The system may modify the sub-block structure from time-to-time to meet changing criteria, signaling the change in a manner expected to be received by all recipients of the broadcast. Meta data indicating the format and data rate of less robust modulations may be provided in the most robust modulation.

In at least one embodiment, acknowledgements of broadcast data from receivers of that data may include feedback on the link margins to the respective receivers, allowing for assessment and adaptation of the signal required to reach individual user, or groups of users.

In at least one embodiment, each data segment may encoded 308, 310, 312, 314 according to forward error correction encoding algorithm. In at least one embodiment, the separate data segments are encoded in parallel, for example by a threaded process.

The bit streams segments are received 316 and organized 318 into sub-blocks according to the priority of the data segment. In at least one embodiment, sub-blocks are organized in decreasing level of priority (increase data rate). Alternatively, sub-blocks may be organized with high priority sub-blocks at the periphery and lower priority sub-blocks in the interior.

In at least one embodiment, each sub-block is modulated 320, 322, 324, 326 according to a modulation scheme such as PSK, QAM, etc., with each sub-block potentially employing a different modulation. Known symbol or signal segments are appended 328 to the organized and modulated data block to facilitate data detection and the stream is transmitted 330. It may be appreciated that after transmission, the signal may undergo further processing such as filtering, upconversion, etc.

Figure 4A:
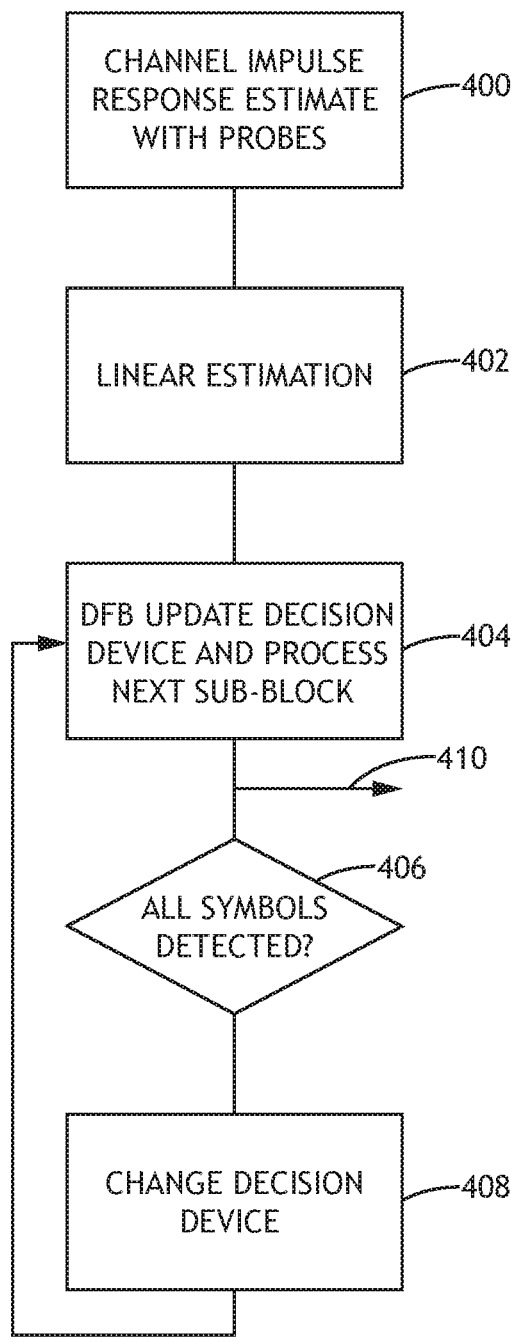
FIG. 4A shows a flowchart for a method of detecting symbols in a data stream having variable data rates according to an exemplary embodiment.
Figure 4B:
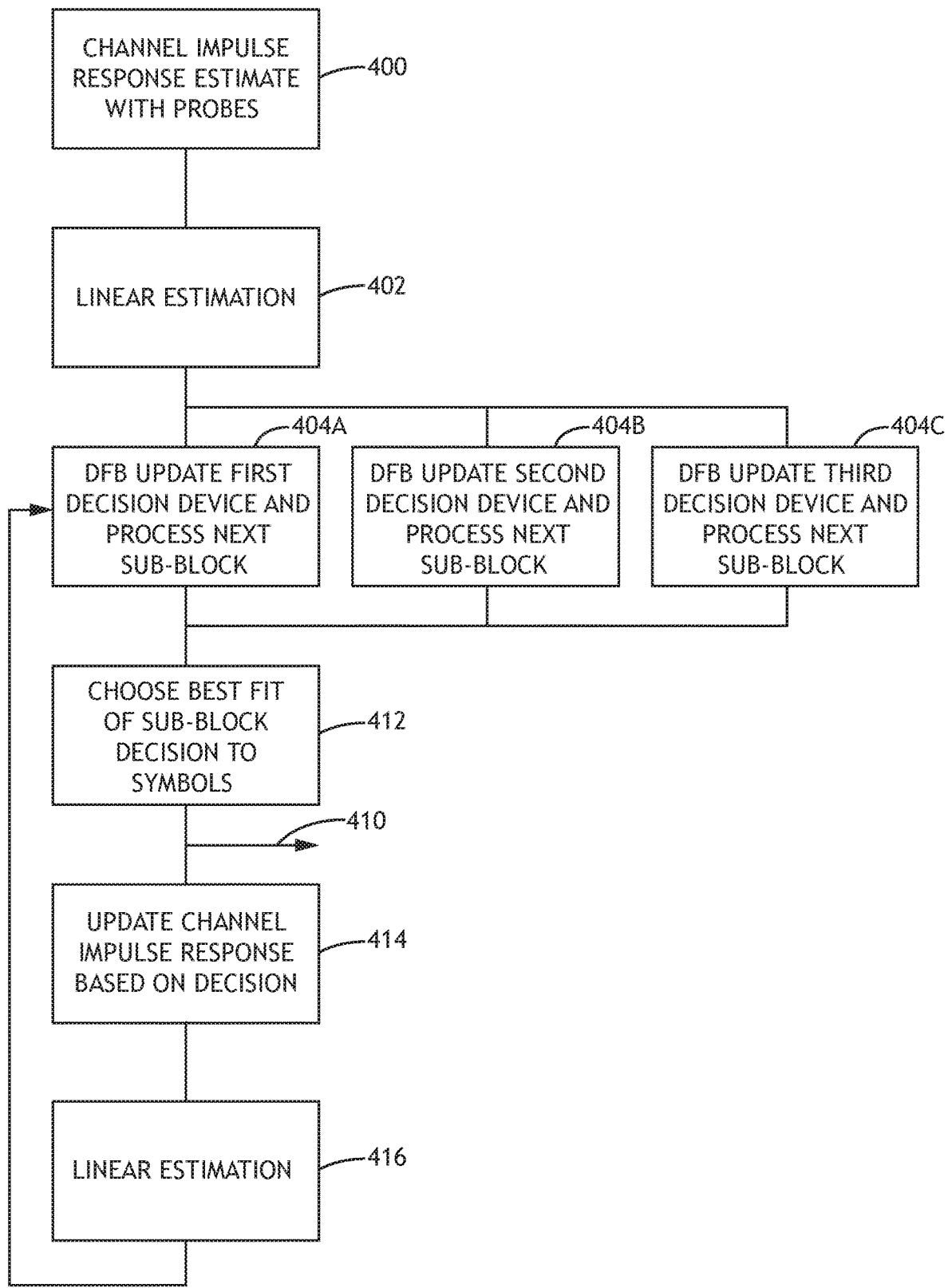
FIG. 4B shows a flowchart for a method of detecting symbols in a data stream having variable data rates according to an exemplary embodiment.

Referring to FIGS. 4A and 4B, flowcharts for methods of detecting symbols in a signal having variable modulation according to exemplary embodiments are shown; the process may be more fully understood with reference to U.S. Pat. No. 5,790,598. Where a system receives a signal comprising a plurality of separately modulated segments as described herein, the system estimates 400 a channel impulse response and forms a detection block. Linear estimation is performed 402 over the whole received data block to identify the most likely signal to have produced the received signal.

In at least one embodiment (such as in FIG. 4A), a decision feedback algorithm employing a specific decision device then processes 404 a sub-block. Detected symbols are output 410. After all symbols within a sub-block are detected, the decision device may be changed 408 and the processes restarts with the new (or same) decision device employed in a decision feedback process algorithm to process 404 the next sub-block.

In at least one embodiment (such as in FIG. 4B), after the channel impulse response is estimated 400 and linear estimation is performed 402 over the whole data block, parallel processes (potentially embodied in separate processing cores or separate execution threads) each employ a different decision device within a decision feedback algorithm that processes 404A, 404B, 404C the same sub-block. A most likely decision device is chosen 412 based on the best-fit of the corresponding sub-block decisions to symbols corresponding to the decision devices being evaluated. Detected symbols are then output 410.

In at least one embodiment, the parallel decision feedback processes detect the modulation in the sub-block without knowing it in advance by detecting certain metrics in the signal; for example the sum of the squared signal space distances as defined by the received symbols in the sub-block from reference symbols that the detection process maps them to. Furthermore, because the detection process from more robust to less robust modulations, the system may reduce the number of potential decision devices as the sub-blocks are processed 404A, 404B, 404C so that only decision devices that are as robust or less than used for the previous sub-block are used.

In at least one embodiment, based on the identified decision device, the channel impulse response is updated 414 and linear estimation for a reduced block is performed 416. Updating 414 the channel impulse response estimate based on decisions and re-performing 416 the linear estimation for the reduced block is computationally expensive, but may provide better performance when the channel impulse response changes over the course of the data block being detected.

The processes may then restart for the next sub-block. In one embodiment, the process for the next sub-block may proceed using the chosen 412, "best-fit" decision device for processing 404. Alternatively, the process may restart by parallel processes implementing different decision devices, each executing a decision feedback algorithm to processes 404A, 404B, 404C the next sub-block. In at least one embodiment, the first and most robust sub-block may comprise sub-block size and modulation metadata. Such metadata may be used to identify an appropriate decision device for subsequent sub-blocks such that identifying the appropriate decision device and modulation is unnecessary.

Systems and methods according to the present disclosure are applicable to support voice and data services for commercial aircraft, serviced from a network of HF ground stations. An HF ground station will support a substantial number of aircraft via broadcast on a single frequency. Ground stations will remain keyed at all times, inserting data packets into an ongoing uplink stream to avoid the overhead associated with the need to provide a preamble at the beginning of each transmission. Aircraft will respond on separate downlink channels and can acknowledge receptions and provide indication of the quality of the received signal for that aircraft. Wideband HF channels will provide much higher data rates to those aircraft that are in a segment of their flight leg where propagation allows for good reception. At the same time, some of the aircraft being supported will likely have much worse conditions, demanding much lower data rates to provide the robustness needed to reach them. Multipath delay spread at HF is substantial, resulting in substantial overheads to support equalization. For 3 kHz channels, in modern waveforms, the known symbol blocks are typically on the order of 30 symbols. To maintain the same multipath delay spread capability in wideband channels, this value will scale linearly upwards as the symbol rate is increased. This overhead makes it undesirable to try to change the data rate on a data block boundary with small data blocks. Accordingly, a method of supporting ongoing broadcasts with variable data rates is particularly useful.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising: at least one processor in data communication with a memory storing processor executable code for configuring the at least one processor to: receive a data block; divide the data block into at least two sub-blocks by prioritizing segments of the data block based on sets of intended recipients; encode a first sub-block at a first data rate modulation; encode a second sub-block at a second data rate modulation; append the second sub-block to the first sub-block to create a combined data block; affix a set of known symbols to the combined data block; and broadcast the combined data block and appended known symbols.

2. The computer apparatus of claim 1, wherein:
the first sub-block defines a first channel directed to a first set of recipients; and
the second sub-block defines a second channel directed to a second set of recipients.

3. The computer apparatus of claim 1, wherein:
the first sub-block comprises a first channel directed to a first set of recipients; and
the second sub-block comprises a second channel directed to a second set of recipients.

4. The computer apparatus of claim 3, wherein the at least one processor is further configured to:
receive acknowledgments from the sets of recipients; and
alter at least one of the first data rate modulation or second data rate modulation based on the received acknowledgements.

5. The computer apparatus of claim 1, wherein the at least one processor is further configured to:
receive feedback from one or more recipients regarding a quality of reception; and
select a modulation for a sub-block associated with one or more of the one or more recipients based on the feedback.

6. The computer apparatus of claim 1, wherein:
the first sub-block comprises a lowest data rate sub-block; and
the at least one processor is further configured to include in the first sub-block information pertaining to a number, size, and modulation of sub-blocks in the data block.

7. A method for detecting a signal with varying data rate modulation comprising:
receiving a signal with sub-blocks; each sub-block having a different modulation;
utilizing known symbols in the signal to compute initial channel impulse responses;
detecting a first sub-block;
outputting the decoded first sub-block;
detecting a second sub-block;
instantiating a decision device for each of a plurality of potential modulations for each of the first sub-block and second-sub-block;
performing symbol detection by each decision device;
determining a best fit modulation for each of the first sub-block and second sub-block; and
outputting the decoded second sub-block.

8. The method of claim 7, wherein detecting the second sub-block comprises receiving detected symbols from the first sub-block and using them as known symbols within the detection process.

9. The method of claim 7, further comprising:
identifying metadata in the first sub-block defining modulation and size of subsequent sub-blocks; and
using the metadata during detection of the subsequent sub-blocks.

10. The method of claim 7, further comprising:
updating a channel impulse response estimate based on at least one of the detection of the first sub-block or the detection of the second sub-block; and
creating a new reduced data block comprising undetected sub-blocks based on one or more detected symbols and the updated channel impulse response estimate.

11. The method of claim 7, further comprising:
decoding a third sub-block;
outputting the decoded third sub-block;
decoding a fourth sub-block; and
outputting the decoded fourth sub-block.

12. The method of claim 11, wherein:
the first sub-block and fourth sub-block define low data rate sub-blocks;
the second sub-block and third sub-block define high data rate sub-blocks; and
the first sub-block and fourth sub-block are disposed at the periphery of a data block in the signal.

13. The method of claim 7, further comprising:
determining a signal quality for the signal based on an average signal quality of two or more sub-blocks; and
sending feedback to a transmitter pertaining to the signal quality.

* * * * *